May 3, 1932.    J. KISS    1,856,999
AIRPLANE SAFETY DEVICE
Filed Dec. 2, 1931
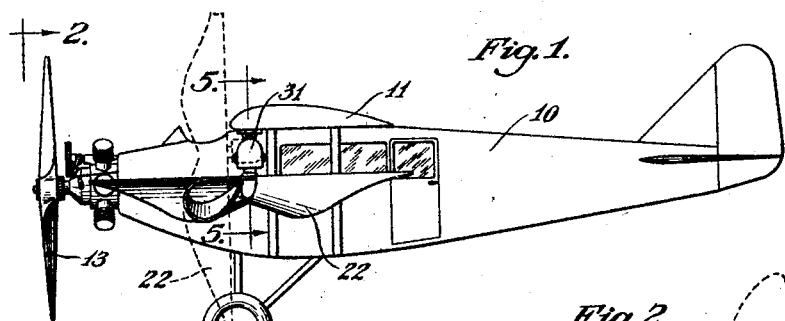
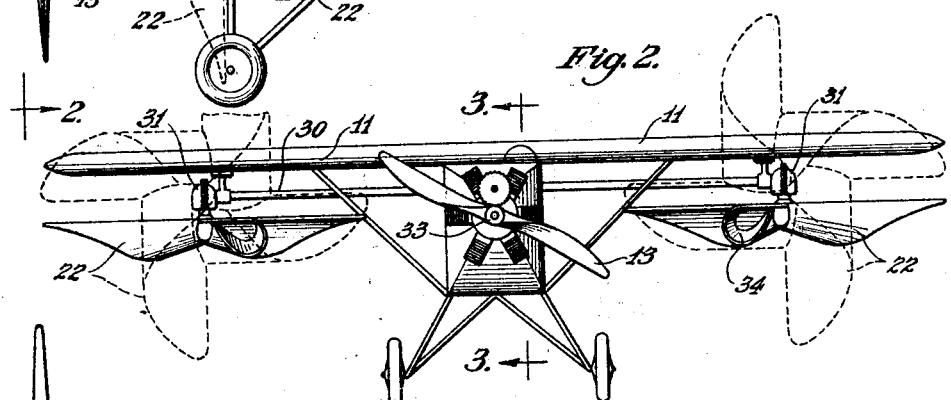
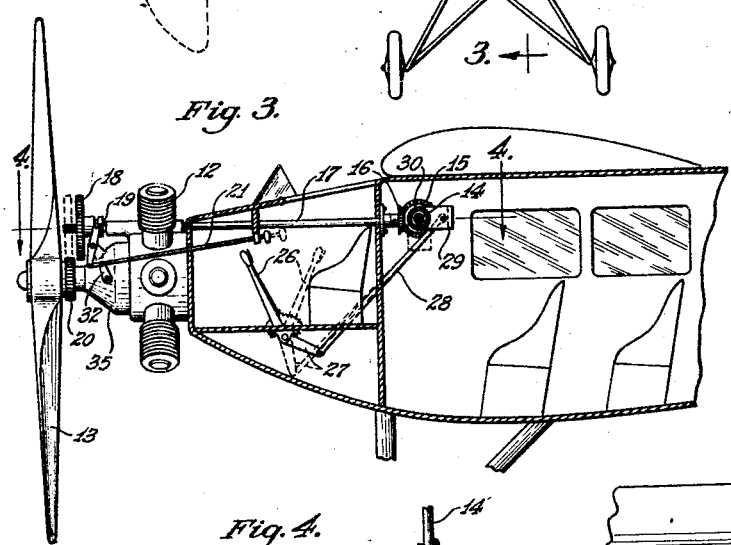
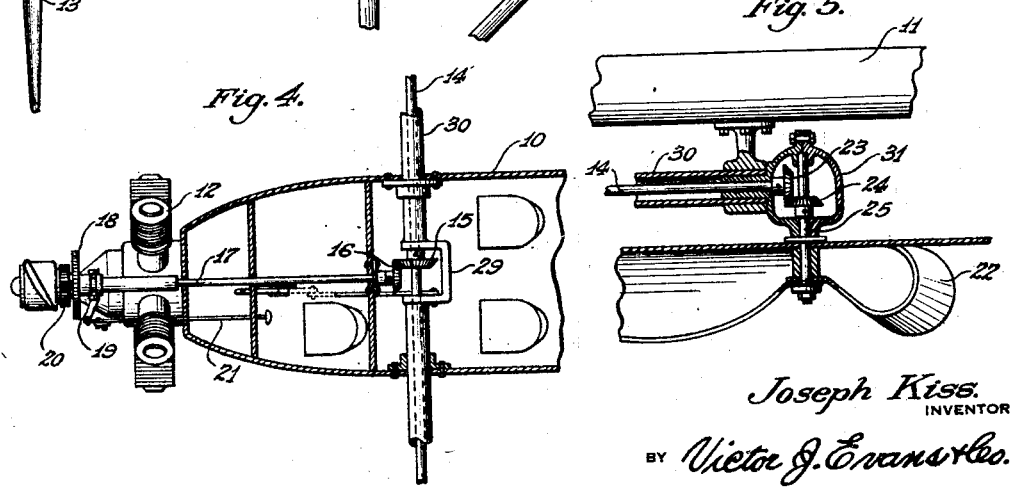
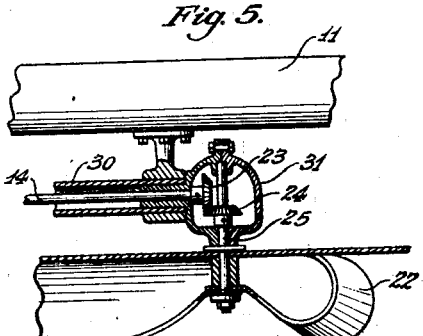
Joseph Kiss.
INVENTOR
BY Victor J. Evans & Co.
HIS ATTORNEYS Patented May 3, 1932

1,856,999

UNITED STATES PATENT OFFICE

JOSEPH KISS, OF RIVER FOREST, ILLINOIS, ASSIGNOR OF ONE-HALF TO ARTHUR SCHIRMACHER, OF OAK PARK, ILLINOIS

AIRPLANE SAFETY DEVICE

Application filed December 2, 1931. Serial No. 578,585.

This invention relates to certain novel improvements in airplane safety devices, and has for its principal object the provision of an improved construction of this character which will be highly efficient in use and economical in manufacture.

It is the primary object of this invention to provide unique and effective means for sustaining an airplane in flight when its motive power fails.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a side elevational view of a conventional airplane embodying the invention;

Fig. 2 is a front elevational view on line 2—2 in Fig. 1;

Fig. 3 is a sectional view on line 3—3 in Fig. 2;

Fig. 4 is a sectional view on line 4—4 in Fig. 3; and

Fig. 5 is a sectional view on line 5—5 in Fig. 1.

In the drawings, which illustrate a preferred and practical embodiment of the invention, 10 indicates generally the fuselage of an airplane having wings 11 and a motor 12 which drives a conventional type of propeller 13 on a propeller shaft 33. Extending transversely of the fuselage 10 is a rotatable shaft 14 on which is fixed a beveled gear 15 which meshes with a beveled gear 16 on a shaft 17 that extends parallel to the axis of the fuselage. This shaft 17 has a gear 18 splined thereon which is movable by a clutch 19 into mesh with a gear 20 on the propeller shaft 33. A control rod 21 operates the clutch 19 to move the gear 18 into and out of mesh with gear 20 whereby the auxiliary propellers 22 that are suspended from the wings 11 will drive the propeller 13 in a manner to be explained presently, and thereby keep the airplane in flight should the motor 12 fail. Each of the propellers 22 is provided with a funnel 34 so designed that when the propellers are in vertical (dotted line) position the air rushing therethrough will rotate said propellers 22.

The shaft 14 carries at each end a beveled gear 23 and these gears 23 mesh with beveled gears 24 on which are, in normal flying, arranged in horizontal and ineffective position. However, should the motor 12 fail, the pilot operates a lever 26 which acts through a link 27 and lever 28 to rotate a yoke 29 that is attached to rotatable tubular housings 30 which are arranged about the shaft 14. These housings 30 have attached to their outer ends housings 31 in which shafts 25 are journaled.

Should the motor 12 of the plane stall in flight the pilot pulls the control lever 26 from full to dotted line position of Fig. 3 and thereby causes lever 28 to rotate yoke 29, housings 30 and 31 clockwise, as seen in Figs. 1 and 3, whereby the propellers 22 are swung from horizontal (full line) position. The pilot at this time pulls the control lever 21 which acts through clutch 19 to mesh gear 18 with gear 20 on the propeller shaft 33 while a pivotal arm 32 attached to the rod 21 acts on a conventional clutch 35 to disengage the propeller shaft 33 from the crank shaft of motor 12 so that the propeller 13 will not have to rotate against compression in the motor. The force of the air then striking the propellers 22 and rushing through their funnels 34 then rotates the propellers 22 in a vertical plane and said propellers 22 transmit motion through shafts 25 and gears 24 and 23 to shaft 14 and gear 15 which in turn will rotate gear 16, shaft 17, gear 18, gear 20 and the propeller shaft 33 to rotate propeller 13 and thus sustain the plane in flight.

By pushing rod 21 forward the gear 18 may be disengaged from gear 20 while at the same time is arm 32 operated whereby the clutch 35 will connect the propeller shaft 33 and the motor crank shaft. By moving control lever 26 to full line position of Fig. 3, rod 28 will act on yoke 29 and housings 30 and 31 to rotate the same and propellers 22 counterclockwise (Fig. 1) whereby to reposition the propellers 22 in a horizontal plane and in ineffective position under the wings 11.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. The combination in an airplane of a propeller and motor-driven shaft therefor, an auxiliary rotative propeller including an air funnel and normally disposed in an ineffective position on the plane, means for moving the auxiliary propeller into an effective position whereby air rushing through said funnel will rotate the auxiliary propeller, and means for transmitting motion of the auxiliary propeller to said propeller shaft should the motor stall whereby the rotation of the auxiliary propeller will drive the first-named propeller and sustain the plane in flight.

2. The combination in an airplane of a propeller and motor-driven shaft therefor, an auxiliary rotative propeller including an air funnel and normally disposed in an ineffective position on the plane, means for moving the auxiliary propeller into an effective position whereby air rushing through said funnel will rotate the auxiliary propeller, means for transmitting motion of the auxiliary propeller to said propeller shaft should the motor stall whereby the rotation of the auxiliary propeller will drive the first-named propeller and sustain the plane in flight, and means for disengaging the propeller shaft from the shaft of the motor so that when the propeller shaft is driven by said auxiliary propeller the first-named propeller will not be rotated against the resistance of the motor.

3. The combination in an airplane of a motor driven propeller shaft and a main propeller thereon, a gear on said shaft, a pair of auxiliary rotary propellers each including an air funnel and normally disposed in an ineffective position on the wings of the plane, supporting shafts for said auxiliary propellers, means for moving the auxiliary propellers into effective position should the motor of the plane fail, whereby air rushing through said auxiliary propellers will rotate the same, and means for transmitting motion of said auxiliary propellers from their shafts to said gear to drive the main propeller shaft and propeller should the motor of the plane stall whereby to sustain the plane in flight.

4. The combination in an airplane of a motor driven propeller shaft and a main propeller thereon, a gear on said shaft, a pair of auxiliary rotary propellers each including an air funnel and normally disposed in an ineffective position on the wings of the plane, supporting shafts for said auxiliary propellers, means for moving the auxiliary propellers into an effective position should the motor of the plane fail, whereby air rushing through said auxiliary propellers will rotate the same, means for transmitting motion of said auxiliary propellers from their shafts to said gear to drive the main propeller shaft and propeller should the motor of the plane stall whereby to sustain the plane in flight, and means for disengaging the main propeller shaft from the shaft of the motor so that when said main propeller shaft is driven by said auxiliary propellers the main propeller will not be rotated against the resistance of the motor.

In testimony whereof I affix my signature.

JOSEPH KISS.